US009894635B2

(12) United States Patent
Loureiro et al.

(10) Patent No.: US 9,894,635 B2
(45) Date of Patent: Feb. 13, 2018

(54) LOCATION CONFIGURATION INFORMATION

(71) Applicant: Nokia Technologies Oy, Espoo (FI)

(72) Inventors: Alexandre Jose Figueiredo Loureiro, Ed. Camargo Correa (BR); Fuad Mousse Abinader, Jr., Manaus-AM (BR); Rafhael Amorim, Guará (BR); Graham Rowse, Hampshire (GB)

(73) Assignee: Provenance Asset Group LLC, Essex, CT (US)

( * ) Notice: Subject to any disclaimer, the term of this patent is extended or adjusted under 35 U.S.C. 154(b) by 0 days.

(21) Appl. No.: 14/902,785

(22) PCT Filed: Jul. 30, 2013

(86) PCT No.: PCT/FI2013/050779
§ 371 (c)(1),
(2) Date: Jan. 4, 2016

(87) PCT Pub. No.: WO2015/015044
PCT Pub. Date: Feb. 5, 2015

(65) Prior Publication Data
US 2016/0174186 A1   Jun. 16, 2016

(51) Int. Cl.
| | |
|---|---|
| H04W 24/00 | (2009.01) |
| H04W 64/00 | (2009.01) |
| H04W 4/02 | (2009.01) |
| H04W 24/10 | (2009.01) |
| H04W 84/12 | (2009.01) |

(52) U.S. Cl.
CPC .......... *H04W 64/006* (2013.01); *H04W 4/02* (2013.01); *H04W 4/025* (2013.01); *H04W 4/026* (2013.01); *H04W 24/10* (2013.01); *H04W 84/12* (2013.01)

(58) Field of Classification Search
CPC ....... H04W 4/02; H04W 4/025; H04W 4/026; H04W 4/027; H04W 64/00; H04W 64/003; H04W 64/006
USPC ............. 455/456.1, 456.2, 456.3, 456.6
See application file for complete search history.

(56) References Cited

U.S. PATENT DOCUMENTS

| | | | |
|---|---|---|---|
| 8,000,721 B2 | 8/2011 | Hanner | |
| 9,220,086 B2 * | 12/2015 | Wang | ................. H04B 7/18506 |
| 2004/0033808 A1 * | 2/2004 | Rorabaugh | ........... G01S 5/0289 |
| | | | 455/456.1 |

(Continued)

FOREIGN PATENT DOCUMENTS

WO    2012/115338 A2    8/2012

OTHER PUBLICATIONS

International Search Report and Written Opinion received for corresponding Patent Cooperation Treaty Application No. PCT/FI2013/050779, dated Apr. 14, 2014, 13 pages.

(Continued)

*Primary Examiner* — Temica M Beamer

(57) ABSTRACT

A location configuration information response (250) comprises a single frame of data. The response includes a data field having a length equal to the length indicated in the length field and including data indicating yaw, pitch and roll orientation parameter values of the subject. A location configuration information request (249) comprises a single frame of data. The request includes a data field indicating an orientation request.

19 Claims, 5 Drawing Sheets

(56) References Cited

U.S. PATENT DOCUMENTS

| | | | | |
|---|---|---|---|---|
| 2006/0270421 A1* | 11/2006 | Phillips | ............. | G08B 21/0236 455/457 |
| 2010/0283679 A1 | 11/2010 | Levy et al. | | |
| 2011/0242134 A1 | 10/2011 | Miller et al. | | |
| 2012/0212405 A1 | 8/2012 | Newhouse et al. | | |
| 2013/0050499 A1 | 2/2013 | Siklossy et al. | | |
| 2013/0102419 A1 | 4/2013 | Jeffery et al. | | |
| 2015/0208376 A1* | 7/2015 | Sendonaris | ............. | G01S 19/46 455/456.1 |
| 2016/0057611 A1* | 2/2016 | Gong | ................ | H04B 7/0452 370/329 |

OTHER PUBLICATIONS

IEEE Standard 802.11k-2008: Amendment1: Radio resource measurement of wireless LANs, IEEE, 2008. pp. 29-31, 51-53.

"Get Ready to Remix Your Videos With Vyclone", Windows, Retrieved on Jan. 10, 2017, Webpage available at : https://blogs.windows.com/devices/2013/05/10/get-ready-to-remix-your-videos-with-vyclone#difROXJbXt1jqi44.97.

"IEEE Standard for Information technology—Telecommunications and information exchange between systems Local and metropolitan area networks—Specific requirements Part 11: Wireless LAN Medium Access Control (MAC) and Physical Layer (PHY) Specifications", IEEE Std 802.11™—2012, Mar. 29, 2012, 2793 pages.

"Bluetooth Specification Version 4.0", Specification of the Bluetooth System, Jun. 30, 2010, 2302 pages.

"IEEE Standard for Information technology—Telecommunications and information exchange between systems—Local and metropolitan area networks—Specific requirements Part 11: Wireless LAN Medium Access Control (MAC)and Physical Layer (PHY) Specifications", IEEE Std 802.11™—2007, Jun. 12, 2007, 1232 pages.

Extended European Search Report received for corresponding European Patent Application No. 13890388.5, dated Nov. 17, 2016, 6 pages.

* cited by examiner

LOCATION CONFIGURATION INFORMATION

RELATED APPLICATION

This application was originally filed as PCT Application No. PCT/FI2013/050779 filed Jul. 30, 2013.

FIELD OF THE INVENTION

This invention relates to location configuration information in wireless communication systems and in particular, although not exclusively, to location configuration information in wi-fi or IEEE 802.11 systems.

BACKGROUND TO THE INVENTION

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

Bluetooth Low Energy (BLE) is a new wireless communication technology published by the Bluetooth SIG as a component of Bluetooth Core Specification Version 4.0. BLE is a lower power, lower complexity, and lower cost wireless communication protocol, designed for applications requiring lower data rates and shorter duty cycles. Inheriting the protocol stack and star topology of classical Bluetooth, BLE redefines the physical layer specification, and involves many new features such as a very-low power idle mode, a simple device discovery, and short data packets, etc.

SUMMARY OF THE INVENTION

Various aspects of examples of the invention are set out in the claims.

A first aspect of the invention provides a method comprising:
  storing in memory a location configuration information response comprising a single frame of data and including:
    a measurement type field including data indicating a location of a subject,
    a latitude field including data indicating a latitude in degrees of the subject,
    a longitude field including data indicating a longitude in degrees of the subject,
    an altitude field including data indicating an altitude,
    a subelement comprising:
      a subelement identifier field including data indicating that the subelement is an orientation response subelement,
      a length field including data indicating a length of a data field, and
      a data field having a length equal to the length indicated in the length field and including data indicating yaw, pitch and roll orientation parameter values of the subject.

The frame of data may be a radio measurement response action frame.

The data field may include data indicating a resolution of the yaw orientation parameter values and/or the pitch orientation parameter values and/or the roll orientation parameter values of the subject.

The data field may include data indicating whether the yaw orientation parameter values and/or the pitch orientation parameter values and/or the roll orientation parameter values of the subject are absolute or relative values.

The data field may include data indicating that the yaw, pitch and roll orientation parameter values of the subject are values relative to reference planes of a body of the subject. Alternatively, the data field may include data indicating that the yaw orientation parameter values and/or the pitch orientation parameter values and/or the roll orientation parameter values of the subject are relative to a plane defined as intersecting a location of the subject and a location of another device.

The method may comprise measuring yaw, pitch and roll of the subject thereby to provide the indicating yaw, pitch and roll orientation parameter values.

The method may comprise transmitting the location configuration information response. Alternatively, the method may comprise receiving the location configuration information response prior to saving the location configuration information response.

A second aspect of the invention provides a method comprising:
  storing in memory a location configuration information request comprising a single frame of data and including:
    a location subject field including data indicating a class of location of a subject,
    a latitude request resolution field including data indicating a number of valid most significant bits requested for the fixed-point value of latitude in degrees,
    a longitude request resolution field including data indicating a number of valid most significant bits requested for the fixed-point value of longitude in degrees,
    an altitude request resolution field including data indicating a number of valid most significant bits requested for the altitude, a subelement comprising:
a subelement identifier field including data indicating that the subelement is an orientation request subelement,
a length field including data indicating a length of a data field, and
a data field having a length equal to the length indicated in the length field and including data indicating an orientation request.

The frame of data may be a radio measurement request action frame.

The information indicating the orientation request may comprise information identifying whether absolute or relative orientation values are requested.

The method may comprise transmitting the location configuration information request. Alternatively, the method may comprise receiving the location configuration information request prior to saving the location configuration information request.

Another aspect of the invention provides a computer program comprising machine readable instructions that when executed by computing apparatus control it to perform any method above.

A third aspect of the invention provides apparatus configured:
storing in memory a location configuration information response comprising a single frame of data and including:
a measurement type field including data indicating a location of a subject,
a latitude field including data indicating a latitude in degrees of the subject,
a longitude field including data indicating a longitude in degrees of the subject,
an altitude field including data indicating an altitude,
a subelement comprising:
a subelement identifier field including data indicating that the subelement is an orientation response subelement,
a length field including data indicating a length of a data field, and
a data field having a length equal to the length indicated in the length field and including data indicating yaw, pitch and roll orientation parameter values of the subject.

The frame of data may be a radio measurement response action frame.

The data field may include data indicating a resolution of the yaw orientation parameter values and/or the pitch orientation parameter values and/or the roll orientation parameter values of the subject.

The data field may include data indicating whether the yaw orientation parameter values and/or the pitch orientation parameter values and/or the roll orientation parameter values of the subject are absolute or relative values.

The data field may include data indicating that the yaw, pitch and roll orientation parameter values of the subject are values relative to reference planes of a body of the subject. Alternatively, the data field may include data indicating that the yaw orientation parameter values and/or the pitch orientation parameter values and/or the roll orientation parameter values of the subject are relative to a plane defined as intersecting a location of the subject and a location of another device.

The apparatus may be configured to measure yaw, pitch and roll of the subject thereby to provide the indicating yaw, pitch and roll orientation parameter values.

The apparatus may be configured to transmit the location configuration information response. Alternatively, the method may comprise receiving the location configuration information response prior to saving the location configuration information response.

A fourth aspect of the invention provides apparatus configured:
storing in memory a location configuration information request comprising a single frame of data and including:
a location subject field including data indicating a class of location of a subject,
a latitude request resolution field including data indicating a number of valid most significant bits requested for the fixed-point value of latitude in degrees,
a longitude request resolution field including data indicating a number of valid most significant bits requested for the fixed-point value of longitude in degrees,
an altitude request resolution field including data indicating a number of valid most significant bits requested for the altitude,
a subelement comprising:
a subelement identifier field including data indicating that the subelement is an orientation request subelement,
a length field including data indicating a length of a data field, and
a data field having a length equal to the length indicated in the length field and including data indicating an orientation request.

The frame of data may be a radio measurement request action frame.

The information indicating the orientation request may comprise information identifying whether absolute or relative orientation values are requested.

The apparatus may be configured to transmit the location configuration information request. Alternatively, the apparatus may be configured to receive the location configuration information request prior to saving the location configuration information request.

A fifth aspect of the invention provides a data structure comprising a single frame of data and including:
a measurement type field including data indicating a location of a subject,
a latitude field including data indicating a latitude in degrees of the subject,
a longitude field including data indicating a longitude in degrees of the subject,
an altitude field including data indicating an altitude,
a subelement comprising:
a subelement identifier field including data indicating that the subelement is an orientation response subelement,
a length field including data indicating a length of a data field, and
a data field having a length equal to the length indicated in the length field and including data indicating yaw, pitch and roll orientation parameter values of the subject.

The frame of data may be a radio measurement response action frame.

The data field may include data indicating a resolution of the yaw orientation parameter values and/or the pitch orientation parameter values and/or the roll orientation parameter values of the subject.

The data field may include data indicating whether the yaw orientation parameter values and/or the pitch orientation parameter values and/or the roll orientation parameter values of the subject are absolute or relative values.

The data field may include data indicating that the yaw, pitch and roll orientation parameter values of the subject are values relative to reference planes of a body of the subject. Alternatively, the data field may include data indicating that the yaw orientation parameter values and/or the pitch orientation parameter values and/or the roll orientation parameter values of the subject are relative to a plane defined as intersecting a location of the subject and a location of another device.

A sixth aspect of the invention provides a data structure comprising a single frame of data and including:
- a location subject field including data indicating a class of location of a subject,
- a latitude request resolution field including data indicating a number of valid most significant bits requested for the fixed-point value of latitude in degrees,
- a longitude request resolution field including data indicating a number of valid most significant bits requested for the fixed-point value of longitude in degrees,
- an altitude request resolution field including data indicating a number of valid most significant bits requested for the altitude,
- a subelement comprising:
  - a subelement identifier field including data indicating that the subelement is an orientation request subelement,
  - a length field including data indicating a length of a data field, and
  - a data field having a length equal to the length indicated in the length field and including data indicating an orientation request.

The frame of data may be a radio measurement request action frame.

The information indicating the orientation request may comprise information identifying whether absolute or relative orientation values are requested.

A seventh aspect of the invention provides apparatus, comprising at least one processor, at least one memory, and computer-readable code stored on the at least one memory, wherein the computer-readable code when executed controls the at least one processor to perform a method comprising:
storing in memory a location configuration information response comprising a single frame of data and including:
- a measurement type field including data indicating a location of a subject,
- a latitude field including data indicating a latitude in degrees of the subject,
- a longitude field including data indicating a longitude in degrees of the subject,
- an altitude field including data indicating an altitude,
- a subelement comprising:
  - a subelement identifier field including data indicating that the subelement is an orientation response subelement,
  - a length field including data indicating a length of a data field, and
  - a data field having a length equal to the length indicated in the length field and including data indicating yaw, pitch and roll orientation parameter values of the subject.

The frame of data may be a radio measurement response action frame.

The data field may include data indicating a resolution of the yaw orientation parameter values and/or the pitch orientation parameter values and/or the roll orientation parameter values of the subject.

The data field may include data indicating whether the yaw orientation parameter values and/or the pitch orientation parameter values and/or the roll orientation parameter values of the subject are absolute or relative values.

The data field may include data indicating that the yaw, pitch and roll orientation parameter values of the subject are values relative to reference planes of a body of the subject. Alternatively, the data field may include data indicating that the yaw orientation parameter values and/or the pitch orientation parameter values and/or the roll orientation parameter values of the subject are relative to a plane defined as intersecting a location of the subject and a location of another device.

The computer-readable code when executed may control the at least one processor to perform:
measuring yaw, pitch and roll of the subject thereby to provide the indicating yaw, pitch and roll orientation parameter values.

The computer-readable code when executed may control the at least one processor to perform:
transmitting the location configuration information response.

The computer-readable code when executed may control the at least one processor to perform:
receiving the location configuration information response prior to saving the location configuration information response.

An eighth aspect of the invention provides apparatus, comprising at least one processor, at least one memory, and computer-readable code stored on the at least one memory, wherein the computer-readable code when executed controls the at least one processor to perform a method comprising:
storing in memory a location configuration information request comprising a single frame of data and including:
- a location subject field including data indicating a class of location of a subject,
- a latitude request resolution field including data indicating a number of valid most significant bits requested for the fixed-point value of latitude in degrees,
- a longitude request resolution field including data indicating a number of valid most significant bits requested for the fixed-point value of longitude in degrees,
- an altitude request resolution field including data indicating a number of valid most significant bits requested for the altitude,
- a subelement comprising:
  - a subelement identifier field including data indicating that the subelement is an orientation request subelement,
  - a length field including data indicating a length of a data field, and
  - a data field having a length equal to the length indicated in the length field and including data indicating an orientation request.

The frame of data may be a radio measurement request action frame.

The information indicating the orientation request may comprise information identifying whether absolute or relative orientation values are requested.

The computer-readable code when executed may control the at least one processor to perform:
  transmitting the location configuration information request.

The computer-readable code when executed may control the at least one processor to perform:
  receiving the location configuration information request prior to saving the location configuration information request.

A ninth aspect of the invention provides a non-transitory computer-readable storage medium having stored thereon computer-readable code, which, when executed by computing apparatus causes the computing apparatus to perform a method comprising:
  storing in memory a location configuration information response comprising a single frame of data and including:
    a measurement type field including data indicating a location of a subject,
    a latitude field including data indicating a latitude in degrees of the subject,
    a longitude field including data indicating a longitude in degrees of the subject,
    an altitude field including data indicating an altitude,
    a subelement comprising:
      a subelement identifier field including data indicating that the subelement is an orientation response subelement,
      a length field including data indicating a length of a data field, and
      a data field having a length equal to the length indicated in the length field and including data indicating yaw, pitch and roll orientation parameter values of the subject.

The frame of data may be a radio measurement response action frame.

The data field may include data indicating a resolution of the yaw orientation parameter values and/or the pitch orientation parameter values and/or the roll orientation parameter values of the subject.

The data field may include data indicating whether the yaw orientation parameter values and/or the pitch orientation parameter values and/or the roll orientation parameter values of the subject are absolute or relative values.

The data field may include data indicating that the yaw, pitch and roll orientation parameter values of the subject are values relative to reference planes of a body of the subject. Alternatively, the data field may include data indicating that the yaw orientation parameter values and/or the pitch orientation parameter values and/or the roll orientation parameter values of the subject are relative to a plane defined as intersecting a location of the subject and a location of another device.

The computer-readable code when executed may control the computing apparatus to perform:
  measuring yaw, pitch and roll of the subject thereby to provide the indicating yaw, pitch and roll orientation parameter values.

The computer-readable code when executed may control the computing apparatus to perform:
  transmitting the location configuration information response.

The computer-readable code when executed may control the computing apparatus to perform:
  receiving the location configuration information response prior to saving the location configuration information response.

A tenth aspect of the invention provides apparatus, comprising at least one processor, at least one memory, and computer-readable code stored on the at least one memory, wherein the computer-readable code when executed controls the at least one processor to perform a method comprising:
  storing in memory a location configuration information request comprising a single frame of data and including:
    a location subject field including data indicating a class of location of a subject,
    a latitude request resolution field including data indicating a number of valid most significant bits requested for the fixed-point value of latitude in degrees,
    a longitude request resolution field including data indicating a number of valid most significant bits requested for the fixed-point value of longitude in degrees,
    an altitude request resolution field including data indicating a number of valid most significant bits requested for the altitude,
    a subelement comprising:
      a subelement identifier field including data indicating that the subelement is an orientation request subelement,
      a length field including data indicating a length of a data field, and
      a data field having a length equal to the length indicated in the length field and including data indicating an orientation request.

The frame of data may be a radio measurement request action frame.

The information indicating the orientation request may comprise information identifying whether absolute or relative orientation values are requested.

The computer-readable code when executed may control the computing apparatus to perform:
  transmitting the location configuration information request.

The computer-readable code when executed may control the computing apparatus to perform:
  receiving the location configuration information request prior to saving the location configuration information request.

An eleventh aspect of the invention provides a method comprising:
  storing in memory a location configuration information request comprising a single frame of data and including data indicating that the subelement is an orientation request subelement.

A twelfth aspect of the invention provides a method comprising:
  storing in memory a location configuration information response comprising a single frame of data and including data indicating yaw, pitch and roll orientation parameters of a subject.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF EMBODIMENTS

The IEEE 802.11 standard specifies methods and techniques of wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard IEEE 802.11-2007, Wireless Medium Access Control (MAC) and Physical Layer (PHY) Specifications, June 2007 (incorporated herein by reference). Since then, emerging broadband applications have stimulated interest in developing very high-speed wireless networks for short range communication, for example, the IEEE 802.11n, the planned IEEE 802.11ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

IEEE 802.11-2012 is revision of the IEEE 802.11-2007 base standard published as IEEE 802.11-2012, Part 11: Wireless LAN Medium Access Control (MAC) and Physical Layer (PHY) Specifications, March 2012 (incorporated herein by reference). IEEE 802.11u-2012 adds features to improve information exchange between systems.

IEEE 802.11-2012 defines a Location Configuration Information request message that specifies a requested latitude resolution, a requested longitude resolution and a requested altitude resolution. Optionally, an LCI Request can include an Azimuth Request, which specifies a requested azimuth resolution and an azimuth type.

In brief, aspects of this specification provide a Location Configuration Information (LCI) Request message that specifies a requested latitude resolution, a requested longitude resolution, a requested altitude resolution and includes a subelement requesting orientation in terms of pitch, yaw and roll.

Aspects of this specification also provide a Location Configuration Information (LCI) Response message that specifies latitude, longitude, altitude, pitch, yaw and roll.

Figure 1:
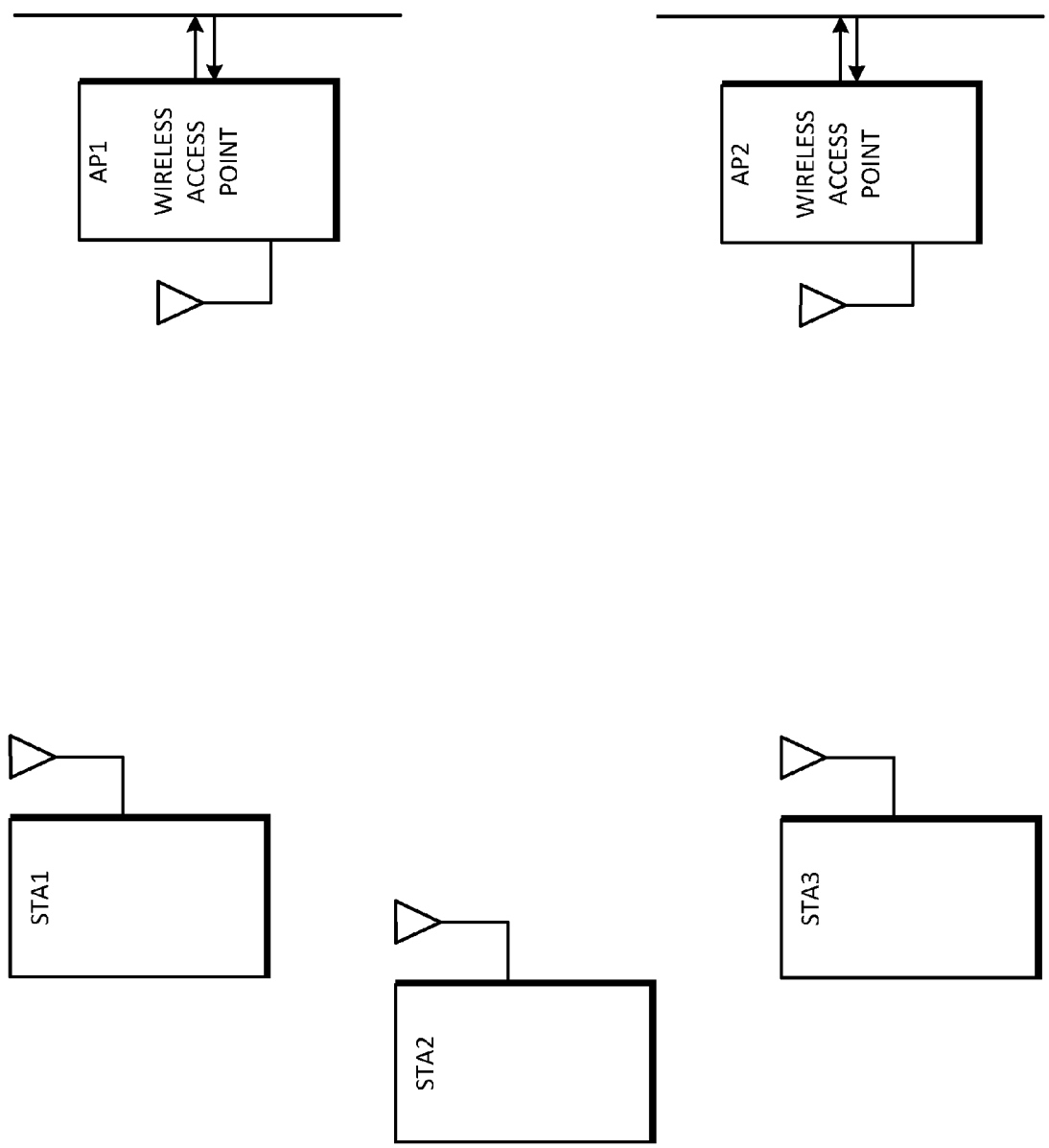
FIG. 1 is a schematic diagram of a system according to aspects of the invention including components according to aspects of the invention and operating according to aspects of the invention.

FIG. 1 illustrates an example wireless network diagram of three mobile wireless devices STA1, STA2, and STA3 in communication range of two access points AP1 and AP2, wherein each of the mobile wireless devices is able to connect to one of the available access points.

The mobile wireless devices STA1, STA2, and STA3 may be mobile phones, smart phones, tablet computers, laptop computers, cameras, mp3-players, equipment integrated within vehicles, etc. The mobile wireless devices STA1, STA2, and STA3 may be based around any suitable operating system, for instance the Symbian™ operating system or Windows™ operating system, although any other operating system may instead be used. The mobile wireless devices STA1, STA2, and STA3 may run different operating systems.

The access points AP1, AP2 may be routers for instance. The access points AP1, AP2 may be mobile or fixed. The access points AP1, AP2 may run any suitable operating system.

Figure 2:
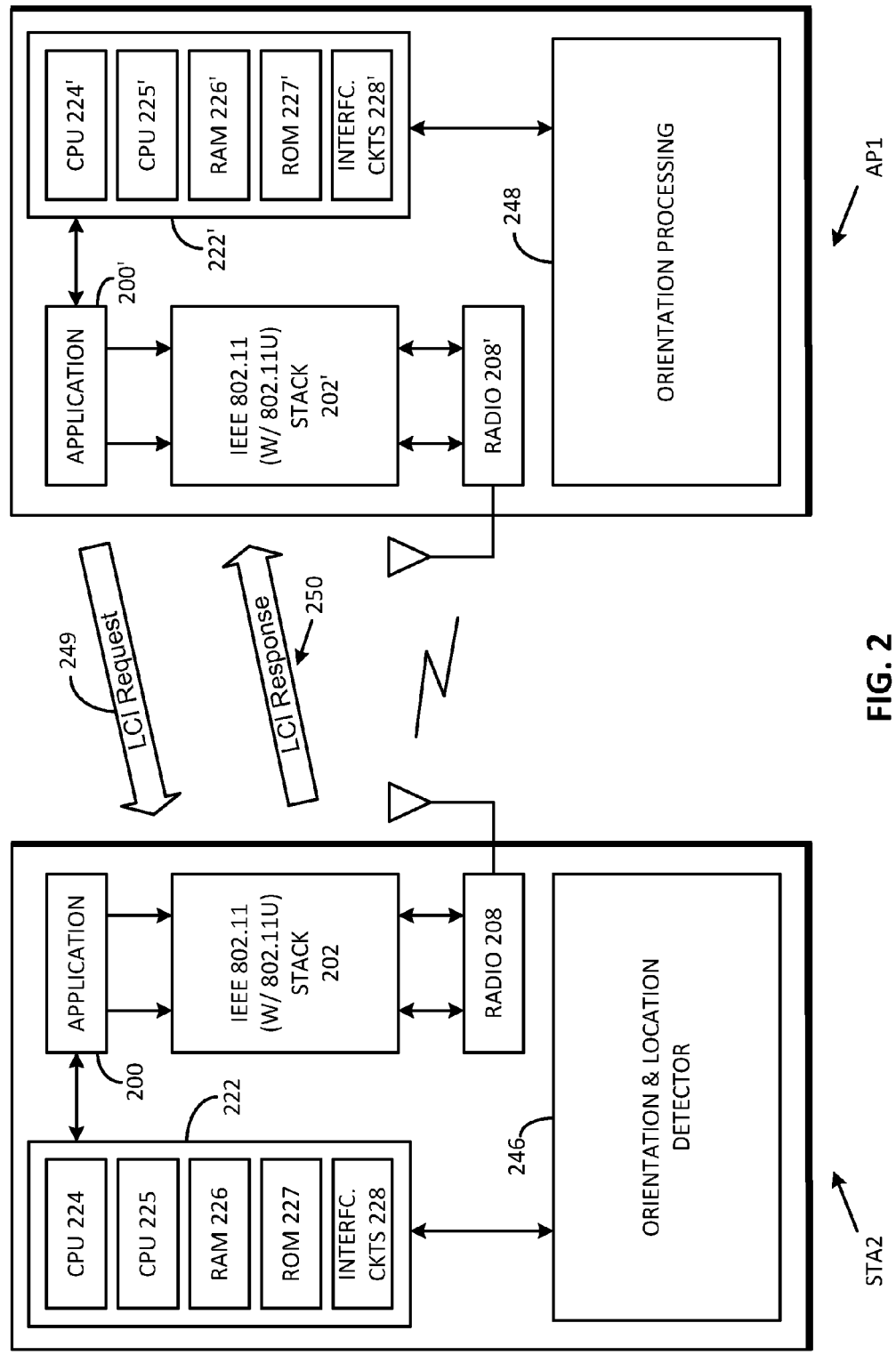
FIG. 2 is a schematic diagram illustrating internal components of devices forming part of the FIG. 1 system according to the invention.

FIG. 2 illustrates an example wireless network and functional block diagram of the mobile wireless device STA2 and the access point AP1.

The mobile wireless device STA2 and the access point AP1 are shown in FIG. 2 in functional block diagram form to illustrate an example embodiment of their components.

The wireless access point AP1 includes a processor 222', which includes a single core CPU or multiple core central processing unit (CPU) 224' and 225', a volatile memory such as random access memory (RAM) 226', a non-volatile memory such as read only memory (ROM) 227'. The wireless access point AP1 includes interface circuits 228' to interface with one or more radio transceivers 208', battery or house power sources, keyboard, display, etc. The RAM and ROM may be removable memory devices such as smart cards, SIMs, WIMs, semiconductor memories such as RAM, ROM, PROMS, flash memory devices, etc. The wireless access point AP1 includes an orientation processing module 248, operation of which is described in more detail below.

The wireless access point AP1 may take any suitable form. Generally speaking, the wireless access point AP1 may comprise processing circuitry 222', including one or more processors, and a storage device 226', 227', comprising a single memory unit or a plurality of memory units. The storage device 226', 227' may store computer program instructions that, when loaded into the processing circuitry 222', control the operation of the wireless access point AP1.

The mobile wireless device STA2 includes a processor 222, which includes a dual core central processing unit 224 and 225, a volatile memory such as random access memory (RAM) 226, a non-volatile memory such as read only memory (ROM) 227. The mobile wireless device STA2 includes interface circuits 228 to interface with one or more radio transceivers 208, battery and other power sources, key pad, touch screen, display, microphone, speakers, ear pieces, camera or other imaging devices, etc. in the mobile wireless device STA2. The RAM and ROM may be removable memory devices such as smart cards, SIMs, WIMs, semiconductor memories such as RAM, ROM, PROMS, flash memory devices, etc.

Figure 3:
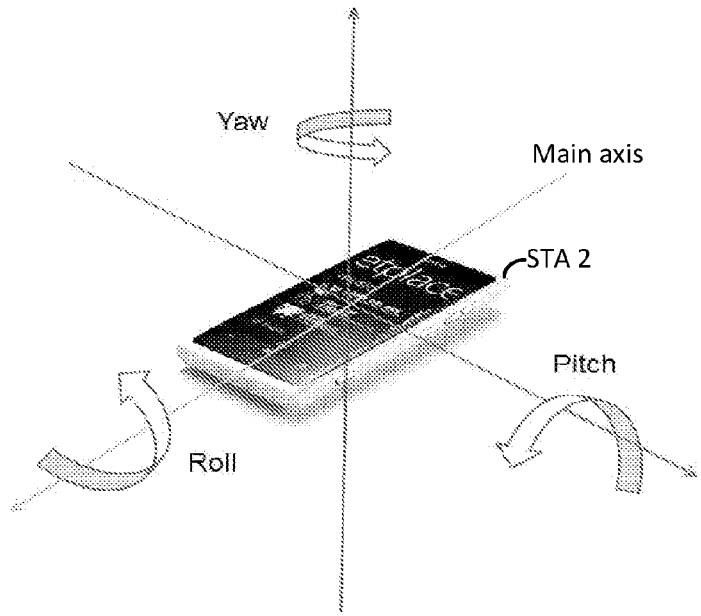
FIG. 3 is a diagram illustrating how orientation may be defined.

The mobile wireless device STA2 also includes a location and orientation detector 246. The location and orientation detector 246 is configured to determine the location of the mobile wireless device STA2 in three dimensions. The location and orientation detector 246 is configured to determine the orientation of the mobile wireless device STA2 on three axes, namely pitch, roll and yaw. Orientation is determined with respect to the main axis of the device STA2, and is illustrated in FIG. 3.

Location may be determined by the location and orientation detector 246 in any suitable way. For instance, location determination may involve a satellite-based or pseudolite-based positioning system such as GPS (Global positioning system). It may alternatively involve an indoor positioning system such as HAIP (high accuracy indoor positioning). Location determination may involve tracking movement of the mobile wireless device STA2 and estimating location based on a known previous location and movement since the mobile wireless device STA2 was at the known location. Movement may be detected using one or more gyroscopes, one or more accelerometers and/or one or more magnetometer sensors. Location is determined in, or alternatively converted to, altitude, longitude and latitude.

Orientation may be determined by the location and orientation detector 246 in any suitable way. For instance, orientation determination may involve one or more magnetometer sensors. Alternatively or additionally, images provided by one or more cameras of the mobile wireless device STA2 may be processed to determine orientation. Orientation determination may involve tracking changes in orientation of the mobile wireless device STA2 and estimating orientation location based on a known previous orientation and changes in orientation since the mobile wireless device STA2 was at the known orientation. Changes in orientation may be detected using one or more gyroscopes, one or more accelerometers and/or one or more magnetometer sensors.

The mobile wireless device STA2 may take any suitable form. Generally speaking, the mobile wireless device STA2 may comprise processing circuitry 222, including one or more processors, and a storage device 226, 227, comprising a single memory unit or a plurality of memory units. The storage device 226, 227 may store computer program instructions that, when loaded into the processing circuitry 222, control the operation of the mobile wireless device STA2.

Some further details of components and features and alternatives for them will now be described.

The computer program instructions may provide the logic and routines that enables the mobile wireless device STA2 to perform the functionality described below. The computer program instructions may be pre-programmed into the mobile wireless device STA2. Alternatively, they may arrive at the mobile wireless device STA2 via an electromagnetic carrier signal or be copied from a physical entity such as a computer program product, a non-volatile electronic memory device (e.g. flash memory) or a record medium such as a CD-ROM or DVD. They may for instance be downloaded to the mobile wireless device STA2 from a server, for instance a server of an application marketplace or store.

The processing circuitry 222, 222' may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 222, 222' may be termed processing means.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

An example of the IEEE 802.11 protocol stack includes the IEEE 802.11u protocol 202 in the mobile wireless device STA2. An example of the IEEE 802.11 protocol stack includes the IEEE 802.11u protocol 202' in the access point device AP1. The protocol stacks 202 and 202' are computer code instructions stored in the RAM and/or ROM memory of the respective processors 222 and 222', which when executed by the central processing units (CPU), carry out the functions described.

The mobile wireless device STA2 and the access point AP2 may comprise further optional software components which are not described in this specification since they may not have direct interaction with the features described.

The mobile wireless devices STA1, and STA3 may be the same as or similar to the mobile wireless device STA2. The access point AP2 may be the same as or similar to the access point AP1.

Briefly, apparatus, for instance the access point AP1, is configured to create and transmit an LCI Request 249 requesting three axis orientation information to another apparatus, for instance the mobile wireless device STA2. The other apparatus, for instance the mobile wireless device STA2, is configured to respond to receiving the LCI Request 249 from the access point AP1 by creating and sending an LCI Response 250 including three axis orientation information. The LCI Response 250 can then be received by the first apparatus, for instance the access point AP1, providing it with the requested orientation information.

Figure 4A:
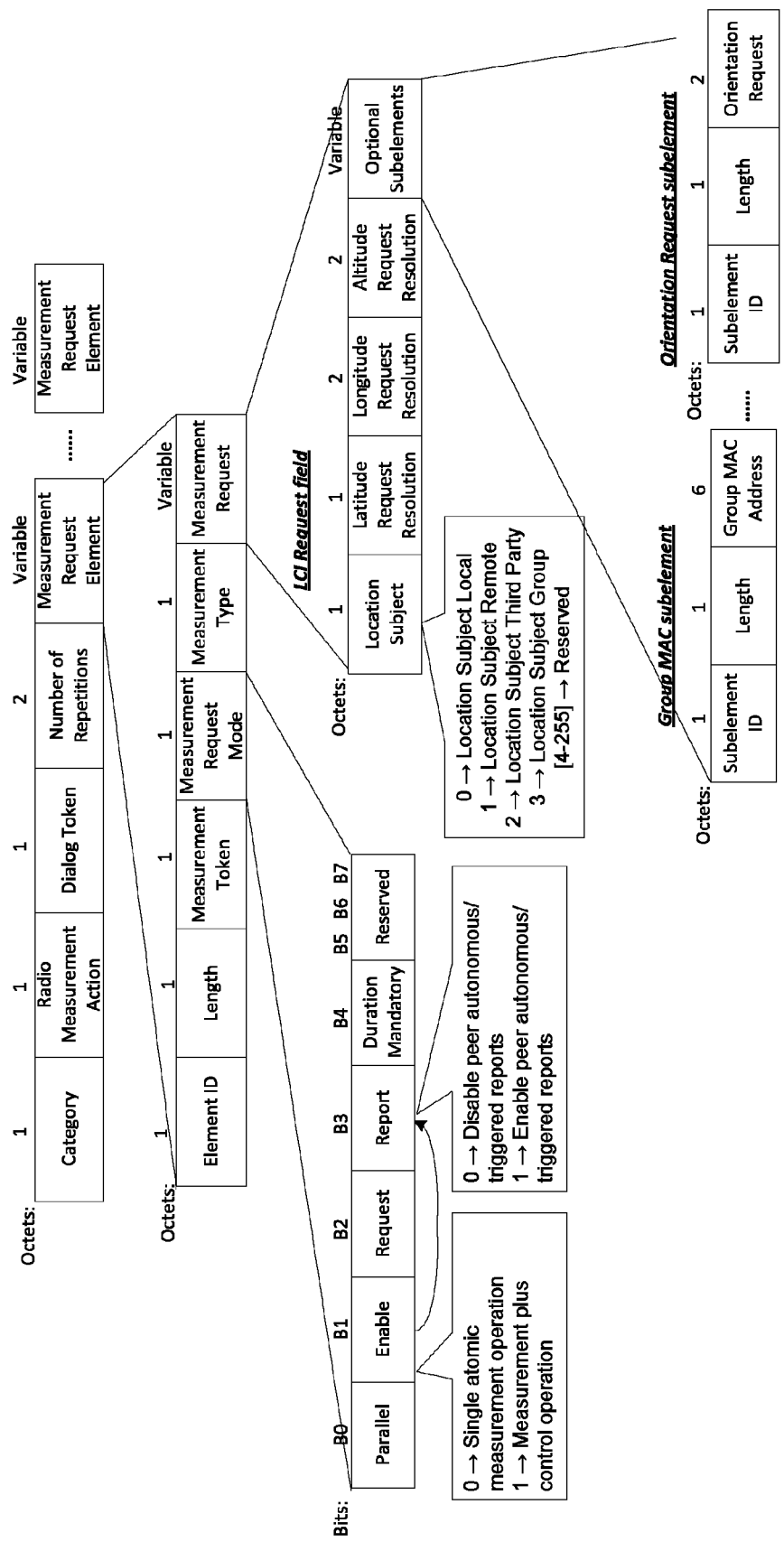
FIG. 4A is diagram of a Radio Measurement Request frame used in embodiments of the invention.

FIG. 4A illustrates the LCI Request 249. The LCI Request 249 forms part of a Radio Measurement Request action frame. The uppermost part of FIG. 4A shows the Radio Measurement action frame. This may take the form specified by section 8.5.7.2 of the IEEE standard 802.11-2012, which section is incorporated herein by reference. The Radio Measurement action frame includes a Category field, a Radio Measurement Action field, a Dialog Token field, a Number of Repetitions field and a number of Measurement Request Element fields. The number of Measurement Request Element fields may be one, or it may be more than one. The number of fields is variable. The Dialog Token is an integer in the range 0 to 255. The value of the Dialog Token identifies the measurement transaction, and may be set to 0 for an autonomous report.

One of the Measurement Request elements is shown below the Radio Measurement action frame in the Figure. This may take the form specified by section 8.4.2.23.1 of the IEEE standard 802.11-2012, which section is incorporated herein by reference. The Measurement Request element includes an Element ID field, a Length field, a Measurement Token field, a Measurement Request Mode field, a Measurement Type field and a number of Measurement Request fields. The number of Measurement Report fields may be one, or it may be more than one. The number of fields is variable.

The Measurement Request Mode field is shown in FIG. 4A below the Measurement Request element. This may take the form specified by section 8.4.2.23.1 of the IEEE standard 802.11-2012, which section is incorporated herein by reference. The second bit B1 of the Measurement Request Mode field indicates measurement operation. A value of 0 indicates single atomic measurement operation and a value of 1 indicates measurement plus control operation. The fourth bit B3 of the Measurement Request Mode field indicates whether peer autonomous/triggered reports are enabled or disabled. A value of 0 indicates that peer autonomous/triggered reports are disabled and a value of 1 indicates that peer autonomous/triggered reports are enabled. This is defined in Table 8-58 and section 8.4.2.23.1 of the IEEE standard 802.11-2012, which table and section are incorporated herein by reference.

The Measurement Request field includes an LCI Request, which is shown in FIG. 4A below the Measurement Request Element and alongside the Measurement Request Mode field. This may take the form specified by section 8.4.2.23.10 of the IEEE standard 802.11-2012, which section is incorporated herein by reference. The Measurement Request element includes a Location Subject field, a Latitude Request Resolution field, a Longitude Request Resolution field, an Altitude Request Resolution field and a number of additional subelements.

Two of the additional subelements are shown in FIG. 4A.

The first shown subelement is a Group MAC subelement. This is an optional subelement. It includes three fields. A Subelement ID field is for example one octet (byte) in length. A Length field is for example one octet in length. A Group MAC Address field is for example six octets in length.

The Group MAC subelement contains an identifier identifying a node group location being requested by the access point AP1. This group identifier is uniquely identified by a 48-bit multicast MAC address known as the group MAC address. The group identifier is included in the Group MAC address field of the Group MAC subelement.

The second shown subelement is an Orientation Request subelement. This includes three fields. A Subelement ID field is for example one octet (byte) in length. A Length field is for example one octet in length. An Orientation Request field is for example two octets in length.

The Orientation Request subelement contains a 16-bit code indicating the type of the orientation being requested by the access point AP1. This type includes requisitions indicating whether the reported location and orientation updates shall contain absolute or relative values. The Report bit in the Measurement Type field is set to have the value 1. This causes enablement of autonomous LCI Report transmission for this node group.

Upon receiving the LCI Request frame, the mobile wireless device STA2 parses the frame and reads the content.

The mobile wireless device STA2 understands the inclusion of the Orientation Request subelement as a request not only to report Altitude, Longitude and Latitude, but also the Pitch, Yaw and Row information as well when reporting LCI Report frames for itself. the mobile wireless devices in the group.

The mobile wireless device STA2 understands the inclusion of the Group MAC subelement as a request for reporting the location of all mobile wireless devices within the group. The allocation of mobile wireless device to groups and how the mobile wireless devices are notified of the other mobile wireless devices in their group are outside the scope of this disclosure.

If the Group MAC subelement is present, the mobile wireless device STA2 understands the inclusion of the Orientation Request subelement as a request to report Altitude, Longitude and Latitude, Pitch, Yaw and Row information when reporting LCI Report frames for the mobile wireless devices in the group.

Figure 4B:
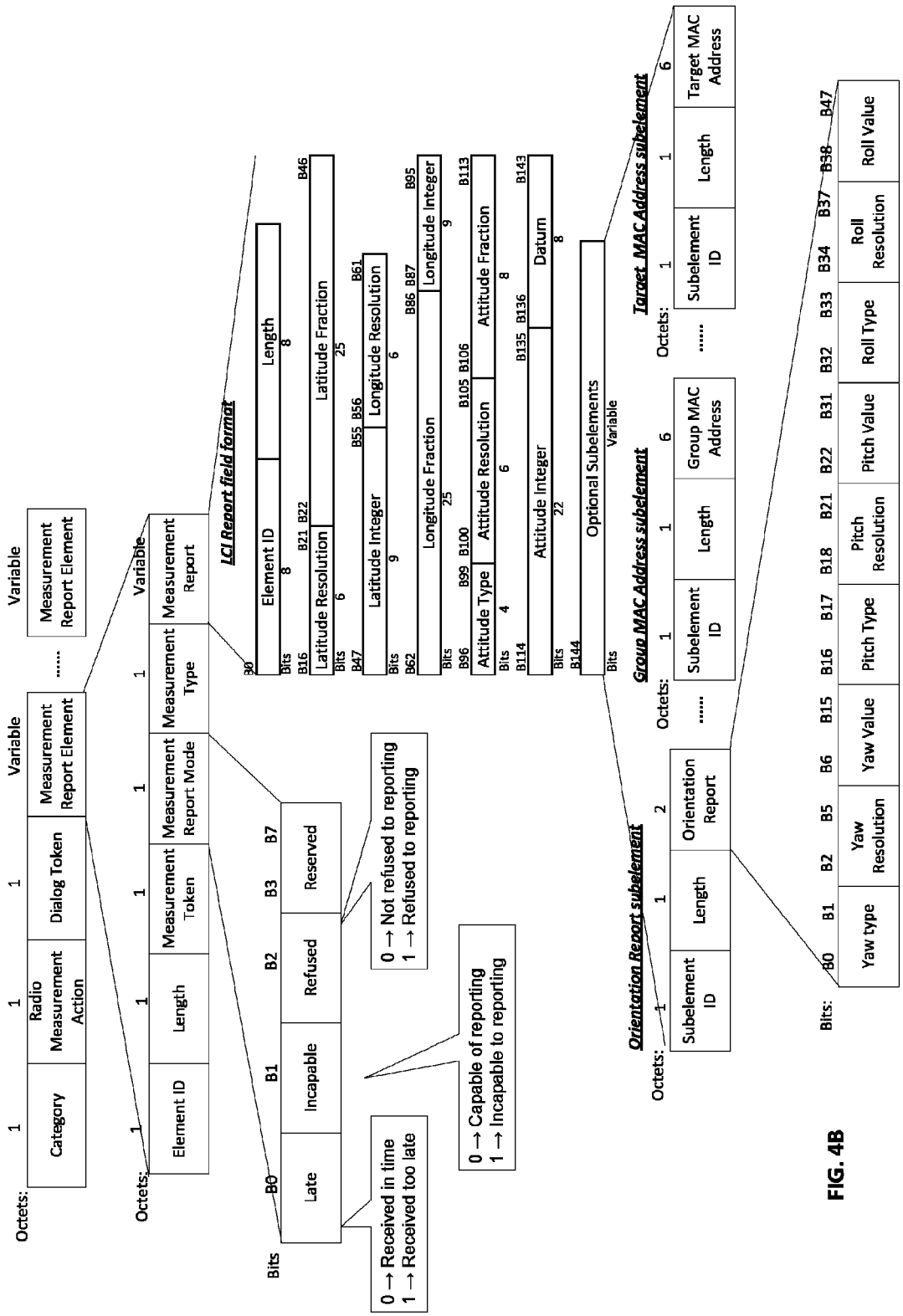
FIG. 4B is diagram of a Radio Measurement Response frame used in embodiments of the invention.

FIG. 4B illustrates the LCI Response 250. The LCI Response 250 forms part of a Radio Measurement Report action frame. The uppermost part of FIG. 4B shows the Measurement Report action frame. This may take the form specified by section 8.4.2.24.1 of the IEEE standard 802.11-2012, which section is incorporated herein by reference. The Radio Measurement Report action frame includes a Category field, a Radio Measurement Action field, a Dialog Token field, a Number of Repetitions field and a number of Measurement Report Element fields. The Dialog Token is an integer in the range 0 to 255. The value of the Dialog Token identifies the measurement transaction, and may be set to 0 for an autonomous report.

One of the Measurement Report elements is shown below the Radio Measurement Report action frame in the Figure. This may take the form specified by section 8.4.2.24.1 of the IEEE standard 802.11-2012, which section is incorporated herein by reference. The Measurement Report element includes an Element ID field, a Length field, a Measurement Token field, a Measurement Report Mode field, a Measurement Type field and a number of Measurement Report fields. The number of Measurement Report fields may be one, or it may be more than one. The number of fields is variable.

The Measurement Report Mode field is shown in FIG. 4B below the Measurement Report element. This may take the form specified by section 8.4.2.24.1 of the IEEE standard 802.11-2012, which section is incorporated herein by reference. The first bit B0 of the Measurement Report Mode field is a Late bit that indicates whether the mobile wireless device STA2 is able or unable to carry out a measurement request because it received the request after the requested measurement time. The second bit B1 of the Measurement Report Mode field is an Incapable bit that indicates whether the mobile wireless device STA2 is incapable of generating a report of the type specified in the Measurement Type field that was previously requested. The second bit is set to 1 to indicate the mobile wireless device STA2 is incapable. The second bit is set to 0 to indicate the mobile wireless device STA2 is capable or the report is autonomous. The third bit B2 is a Refused bit (bit 2) indicates whether the mobile wireless device STA2 is refusing to generate a report of the type specified in the Measurement Type field that was requested. The third bit is set to 1 to indicate the mobile wireless device STA2 is refusing. The third bit is set to 0 to indicate the mobile wireless device STA2 is not refusing or the report is autonomous. This is defined in Table 8-141 and section 8.4.2.24.1 of the IEEE standard 802.11-2012, which table and section are incorporated herein by reference.

The Measurement Report field includes an LCI Report, which is shown in FIG. 4B below the Measurement Report Element and alongside the Measurement Report Mode field. This may take the form specified by section 8.4.2.24.10 of the IEEE standard 802.11-2012, which section is incorporated herein by reference. The Measurement Report element includes an Element ID field, Latitude Report fields (a Latitude Resolution field, a Latitude Fraction field and a Latitude Integer field), Longitude Report fields (a Longitude Resolution field, a Longitude Fraction field and a Longitude Integer field), and Altitude Report fields (a Altitude Resolution field, a Altitude Fraction field and a Altitude Integer field), a Datum field and a number of additional subelements.

Three of the additional subelements are shown in FIG. 4B.

The first subelement is an Orientation Report subelement. It includes three fields. A Subelement ID field is for example one octet (byte) in length. A Length field is for example one octet in length. An Orientation Report field is for example six octets in length.

The Orientation Report field is provided with values that indicate the pitch, yaw and roll of the mobile wireless device STA2, as measured by the orientation and location detector 246. In this way, the LCI Response indicates the orientation on three axes of the mobile wireless device STA2.

Each axis of orientation is indicated in terms of a value. Also, each is indicated by way of a resolution value and a type.

In particular, the yaw of the mobile wireless device STA2 is indicated in the Orientation Report field by Yaw Value bits that indicate the value of the yaw, Yaw Type bits that indicate the type of yaw, and Yaw Resolution bits that indicate the resolution of the yaw value in the Yaw Value bits. The Yaw Type comprises for example two bits. The Yaw Resolution comprises for example four bits. The Yaw Value comprises for example ten bits.

Yaw Type is set to 1 to report the yaw of the bearing of the access point AP1 with respect to the mobile wireless device STA2, and is set to 0 to report the yaw of the body of the mobile wireless device STA2 with regard to the reference yaw defined by the manufacturer. In the former case, the reference is a vertical plane that intersects both the access point AP1 and the mobile wireless device STA2. The reference to which the yaw type relates is set by the mobile wireless device STA2 depending on the content of the Orientation Request field of the LCI Request.

The data in the Yaw Resolution field indicates the number of valid most significant bits of the data in the Yaw Value bits.

The data in the Yaw Value field is an unsigned integer value in degrees from true north, of the type defined by the Yaw Type bits. The value of the yaw in degrees is in the range 0 degrees to 360 degrees. Alternatively, the data in the Yaw Value field may be a signed integer value in degrees from horizontal, of the type defined by the Yaw Type bits. Here, the value of the yaw in degrees is in the range −180 degrees to +180 degrees. The value of the yaw may be in some unit other than degrees, for instance in radians.

The pitch of the mobile wireless device STA2 is indicated in the Orientation Report field by Pitch Value bits that indicate the value of the pitch, Pitch Type bits that indicate the type of pitch, and Pitch Resolution bits that indicate the resolution of the pitch value in the Pitch Value bits. The Pitch Type comprises for example two bits. The Pitch Resolution comprises for example four bits. The Pitch Value comprises for example ten bits.

Pitch Type is set to 1 to report the pitch of the bearing of the access point AP1 with respect to the mobile wireless device STA2, and is set to 0 to report pitch of the body of the mobile wireless device STA2 with regard to the reference yaw defined by the manufacturer. In the former case, the reference is a plane having one axis that is horizontal and that intersects both the access point AP1 and the mobile wireless device STA2. The reference to which the pitch type relates is set by the mobile wireless device STA2 depending on the content of the Orientation Request field of the LCI Request.

The data in the Pitch Resolution field indicates the number of valid most significant bits of the data in the Pitch Value bits.

The data in the Pitch Value field is an unsigned integer value in degrees from horizontal, of the type defined by the Pitch Type bits. The value of the pitch in degrees is in the range 0 degrees to 360 degrees. Alternatively, the data in the Pitch Value field may be a signed integer value in degrees from horizontal, of the type defined by the Pitch Type bits. Here, the value of the pitch in degrees is in the range −180 degrees to +180 degrees. The data in the Pitch Value field may indicate pitch from a reference other than horizontal, for instance from vertical. The value of the pitch may be in some unit other than degrees, for instance in radians.

The roll of the mobile wireless device STA2 is indicated in the Orientation Report field by Roll Value bits that indicate the value of the roll, Roll Type bits that indicate the type of roll, and Roll Resolution bits that indicate the resolution of the roll value in the Roll Value bits. The Roll Type comprises for example two bits. The Roll Resolution comprises for example four bits. The Roll Value comprises for example ten bits.

Roll Type is set to 1 to report the roll of the bearing of the access point AP1 with respect to the mobile wireless device STA2, and is set to 0 to report roll of the body of the mobile wireless device STA2 with regard to the reference yaw defined by the manufacturer. In the former case, the reference is a plane having one axis that is horizontal and that intersects both the access point AP1 and the mobile wireless device STA2. The reference to which the roll type relates is set by the mobile wireless device STA2 depending on the content of the Orientation Request field of the LCI Request.

The data in the Roll Resolution field indicates the number of valid most significant bits of the data in the Roll Value bits.

The data in the Roll Value field is an unsigned integer value in degrees from horizontal, of the type defined by the Roll Type bits. The value of the roll in degrees is in the range 0 degrees to 360 degrees. The data in the Roll Value field may indicate roll from a reference other than horizontal, for instance from vertical. The value of the roll may be in some unit other than degrees, for instance in radians.

The second shown subelement is a Group MAC Address subelement. This is an optional subelement. It includes three fields. A Subelement ID field is for example one octet (byte) in length. A Length field is for example one octet in length. A Group MAC Address field is for example two octets in length.

The Group MAC subelement contains an identifier identifying a node group location being requested by the access point AP1. This group identifier is uniquely identified by a 48-bit multicast MAC address known as the group MAC address. The group identifier is included in the Group MAC address field of the Group MAC subelement.

The second subelement is a Group MAC subelement. This is an optional subelement. The Group MAC subelement is included by the mobile wireless device STA2 if the LCI Request included a Group MAC subelement. The Group MAC subelement includes three fields. A Subelement ID field is for example one octet in length. A Length field is for example one octet in length. A Group MAC Address field is for example six octets in length.

The Group MAC subelement contains an identifier identifying a node group location being requested by the access point AP1. This group identifier is uniquely identified by a 48-bit multicast MAC address known as the group MAC address. The group identifier is included in the Group MAC address field of the Group MAC subelement. The value of the Group MAC subelement is the same as the value of the Group MAC subelement included in the LCI Request.

The third element is a Target MAC Address subelement. The Target MAC Address subelement includes three fields. A Subelement ID field is for example one octet in length. A Length field is for example one octet in length. A Target MAC Address field is for example six octets in length.

The Target MAC Address subelement contains the MAC address of the access point AP1. This address is a 48-bit MAC address in this example. The Target MAC Address is parsed from the LCI Request by the mobile wireless device STA2 and then included in the Target MAC Address field of the Target MAC Address subelement. The value of the Target MAC Address is the same as the value of the MAC address of the access point AP1 included in the LCI Request. The inclusion of the Target MAC Address in the LCI Response allows the access point AP1 to determine that the LCI Response is intended for the access point AP1. It allows other access points to determine that the LCI Response is not intended for them, following which they may ignore or discard the LCI Response.

Upon receiving the LCI Response, the access point AP1 parses the data therefrom and thus obtains various information about the mobile wireless device STA2. This information includes the location of the mobile wireless device STA2 in three dimensions, and advantageously includes the orientation of the mobile wireless device STA2 on three axes. This provides the access point AP1 with the ability to provide a plethora of new services. This is achieved whether or not the Group MAC Address subelements are used in the LCI Request and the LCI Response, Some example uses of the information identifying the location and orientation of the mobile wireless device STA2 will now be described.

An airplane model provided by the access point AP1 or a server connected to receive information from the access point AP1 is able to share orientation of the mobile wireless device STA2 to a virtual server, which can reproduce its movements to a virtual airplane in a screen or in projections transmitted to other people worldwide. The same case can be used for a group of airplanes interacting, using location and orientation information from multiple mobile wireless devices. This is an example of using this application for augmented reality solutions.

A number of mobile wireless devices with cameras recording an event such as a concert or a live game can share their orientation/location information. An application in a mobile wireless device acting as or connected to the access point AP1 can allow selection of one of the cameras according to its orientation and location and merge the cameras to produce a single video. This might be considered to be an extension of the social video platform Vyclone. The use of several cameras can be used to produce 180 or 360 degrees, or even three-dimensional video footage.

A system, such as the access point AP1 or a server coupled to receive information from the access point AP1 can collect the orientation/location information from a group of mobile wireless devices with cameras and merge the resulting videos to create an object or scenario virtual in three dimensions. This case could be applied to a camera-based machine vision system to scan a volume, such as a room including one or more users. The cameras can change the orientation/location and the virtual merged image can be dynamic adjusted.

A group of mobile wireless devices including image projectors can be used together to compose a larger image than could be provides with one device. For example, a combined composed image could project a game scenario image on three or four walls of a living room. If the location and/or orientation of a mobile wireless device is changed, this can be detected by the mobile device and communicated to an access point, which can dynamically adjust the image caused to be projected such as to maintain a desired combined projection.

The location and orientation information relating to multiple mobile wireless devices may be communicated to an access point or other node directly from those mobile devices. This may be achieved in one of two ways.

Firstly, the access point AP1 is configured to send multiple LCI Requests, each one addressed to a different mobile wireless device STA1, STA2, STA3. In this case, each mobile wireless device STA1, STA2, STA3 reports its location and orientation to the access point, without regard to the reporting being conducted by other mobile wireless devices STA1, STA2, STA3.

Secondly, the Group MAC subelement features described above may be used to allow the same result through less signaling. In particular, multiple mobile wireless device STA1, STA2, STA3 are assigned to a particular group MAC address, in any suitable way. The access point AP1 creates and send an LCI Request message including a Group MAC Address subelement that includes the relevant group MAC address. Each mobile wireless device STA1, STA2, STA3 is configured to detect that the LCI Request is addressed to them by detecting the group MAC address and determining that the mobile wireless device is a member of the group. In response, each mobile wireless device STA1, STA2, STA3 creates and transmits an LCI Response to the access point AP1. This achieves the same result as the first option but with less signaling because fewer LCI requests are sent.

Figure 5:
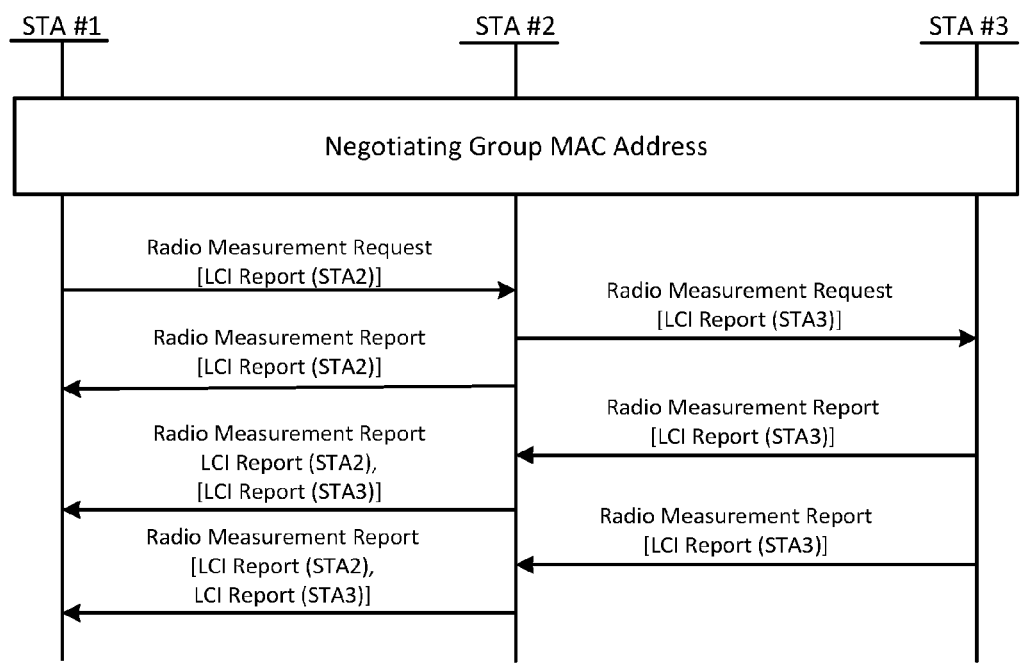
FIG. 5 is a signalling diagram illustrating signalling between devices of the system of FIG. 1 according to embodiments of the invention

Alternatively, the Group MAC subelement features described above may be used to allow a single mobile wireless device STA2 to communicate location and orientation information for multiple wireless devices to the another mobile wireless device STA1, STA3 or access point AP1, AP2. This will now be described with reference to FIG. 5.

In this example, mobile wireless device STA1, STA2, STA3 have already negotiated the nodes participating in the group as well the group ID (i.e. group MAC address).

The first mobile wireless device STA1 starts by sending a Radio Measurement Request frame with an LCI Request field addressed to the second mobile wireless device STA2. This LCI Request contains both the Group MAC and Orientation Request fields. Then, the second mobile wireless device STA2 creates and sends a Radio Measurement Request frame with an LCI Request field to the third mobile wireless device STA3. This LCI Request also contains both the Group MAC and Orientation Request field. The first a Radio Measurement Report frame sent from the second mobile wireless device STA2 to the first mobile wireless device STA1 only contains information relating to the location and orientation of the second mobile wireless device STA2. This occurs because at this time the second mobile wireless device STA2 has not yet received any information regarding the third mobile wireless device STA3. Subsequently, the third mobile wireless device STA3 sends a Radio Measurement Report frame sent to the second mobile wireless device STA2, including information relating to the location and orientation of the third mobile wireless device STA3. Upon receiving the Radio Measurement Report frame the third mobile wireless device STA3, the second mobile wireless device STA2 stores the Report frame. Subsequently, all Radio Measurement Report frames sent from the second mobile wireless device STA2 to the first mobile wireless device STA1 include LCI Report fields relating to the second mobile wireless device STA2 and to the third mobile wireless device STA3. The second mobile wireless device STA2 is configured to discard old location and orientation information for itself and for other mobile wireless devices (here, the third mobile wireless device STA3) whenever updated location and orientation information is available either through self-generation or through receiving the information from another mobile wireless device.

The mobile wireless devices STA1, STA2, STA3 participating in the group utilize IEEE 802.11 native Timing Synchronization Function (TSF) to implement time synchronization among them. For an Independent Basic Subscriber Set (IBSS) (i.e. ad-hoc network), all of the mobile wireless devices STA1, STA2, STA3 periodically exchange timing information through Beacon frames. Also, all the mobile wireless devices replace their own TSF timer information by the information contained in a receiver Beacon frame if these are later than their own. By doing this, all of the mobile wireless device STA1, STA2, STA3 are able to maintain a common timer reference, enabling measurements to be made relative to this common reference time.

The mobile wireless device STA1, STA2, STA3 are configured to create and include in the LCI Report a further subelement. This subelement is termed the Measurement Time subelement. The Measurement Time subelement is for instance a 32-bit field. The Measurement Time subelement contains the common timer reference when the measurements were taken at the mobile wireless device STA1, STA2, or STA3.

Assuming that all of the mobile wireless device STA1, STA2, STA3 in the group maintain a common timer though TSF, the measurement time when the location and orientation was made available for transmission at a reporting mobile wireless device STA1, STA2, STA3 may be notified to other mobile wireless devices STA1, STA2, STA3 by including the Measurement Time subelement in the LCI Report field. This allows improved operation since the time to which location and orientation relates allows for instance the orientation processing module 146 to provide a better result when handling LCI Responses relating to multiple mobile wireless device STA1, STA2, STA3.

It will be appreciated that the above-described embodiments are not limiting on the scope of the invention, which is defined by the appended claims and their alternatives. Various alternative implementations will be envisaged by the skilled person, and all such alternatives are intended to be within the scope of the claims.

The invention is not limited to 802.11. It will be appreciated that the concept underlying the above-described embodiments, as defined in the claims, is applicable to other systems in which communication of device orientation is desirable. Other systems to which the invention may be applied and which are intended to be covered by the claims include Bluetooth, for instance Bluetooth Low Energy.

In a Bluetooth Low Energy embodiment, a first device, such as a master device, transmits an LCI request to a second device, such as a slave device, which responds by transmitting an LCI Response including the orientation (and optionally also the location) of the second device. The orientation includes pitch, roll and yaw values, and optionally also resolution data and/or type data.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The invention claimed is:

1. A method comprising:
   storing in memory of an apparatus a location configuration information response that is one of received from or for transmission to another apparatus over a wireless connection, the location configuration response comprising a single frame of data and including:
   a measurement type field including data indicating a location of a subject,
   a latitude field including data indicating a latitude in degrees of the subject,
   a longitude field including data indicating a longitude in degrees of the subject,
   an altitude field including data indicating an altitude,
   a subelement comprising:
      a subelement identifier field including data indicating that the subelement is an orientation response subelement,
      a length field including data indicating a length of a data field, and
      a data field having a length equal to the length indicated in the length field and including data indicating yaw, pitch and roll orientation parameter values of the subject,
      wherein the data field includes data indicating a resolution of at least one of the yaw orientation parameter values, the pitch orientation parameter values or the roll orientation parameter values of the subject,
      and wherein the yaw, pitch and roll orientation parameter values are from yaw, pitch and roll measurements taken by an orientation detector of a mobile wireless device,
   the method further comprising one of:
   receiving the location configuration information response from the other apparatus over a wireless connection prior to storing the location configuration information response, or transmitting the location configuration information response to the other apparatus over a wireless connection, wherein the other apparatus from which the location configuration information response is received comprises a mobile wireless device, and wherein the other apparatus to which the location configuration information response is transmitted comprises one of a mobile wireless device or a wireless access point.

2. The method as claimed in claim 1, wherein the frame of data is a radio measurement response action frame.

3. The method as claimed in claim 1, wherein the data field includes data indicating whether the yaw orientation parameter values and/or the pitch orientation parameter values and/or the roll orientation parameter values of the subject are absolute or relative values.

4. The method as claimed in claim 1, wherein the data field includes data indicating that the yaw, pitch and roll orientation parameter values of the subject are values relative to reference planes of a body of the subject.

5. The method as claimed in claim 1, wherein the data field includes data indicating that the yaw orientation parameter values and/or the pitch orientation parameter values and/or the roll orientation parameter values of the subject are relative to a plane defined as intersecting a location of the subject and a location of another device.

6. The method as claimed in claim 1, comprising measuring yaw, pitch and roll of the subject to provide the data indicating yaw, pitch and roll orientation parameter values.

7. The method as claimed in claim 1, wherein the apparatus comprises one of a mobile wireless device or an access point when receiving the location configuration information response from the other apparatus.

8. The method as claimed in claim 1, wherein the apparatus comprises a mobile wireless device when transmitting the location configuration information response to the other apparatus.

9. An apparatus, comprising at least one processor, at least one memory, and computer-readable code stored on the at least one memory, the at least one memory and the computer-readable program code configured to, with the at least one processor, cause the apparatus at least to:

store in memory of the apparatus a location configuration information request that is one of received from or for transmission to another apparatus over a wireless connection, the location configuration request comprising a single frame of data and including:

a location subject field including data indicating a class of location of a subject, a latitude request resolution field including data indicating a number of valid most significant bits requested for the fixed-point value of latitude in degrees, a longitude request resolution field including data indicating a number of valid most significant bits requested for the fixed-point value of longitude in degrees, an altitude request resolution field including data indicating a number of valid most significant bits requested for the altitude, an orientation request subelement configured to request at least yaw, pitch and roll orientation parameter values, the orientation request subelement comprising:

a subelement identifier field including data indicating that the subelement is an orientation request subelement, a length field including data indicating a length of a data field, and a data field having a length equal to the length indicated in the length field and including data indicating an orientation request, and wherein the yaw, pitch and roll orientation parameter values are from yaw, pitch and roll measurements taken by an orientation detector of a mobile wireless device, the at least one memory and the computer-readable program code being further configured to, with the at least one processor, cause the apparatus at least to:

receive the location configuration information request from the other apparatus over a wireless connection prior to storing the location configuration information response, or transmit the location configuration information request to the other apparatus over a wireless connection, wherein the other apparatus from which the location configuration information request is received comprises one of a mobile wireless device or a wireless access point, and wherein the other apparatus to which the location configuration information request is transmitted comprises a mobile wireless device.

10. The apparatus as claimed in claim 9, wherein the frame of data is a radio measurement request action frame.

11. The apparatus as claimed in claim 9, wherein the information indicating the orientation request comprises information identifying whether absolute or relative orientation values are requested.

12. The apparatus as claimed in claim 9, wherein the apparatus comprises a mobile wireless device when the at least one memory and the computer-readable program code are configured to, with the at least one processor, cause the apparatus at least to:

receive the location configuration information request from the other apparatus.

13. The apparatus as claimed in claim 9, wherein the apparatus comprises one of a mobile wireless device or an access point when the at least one memory and the computer-readable program code are configured to, with the at least one processor, cause the apparatus at least to:

transmit the location configuration information request to the other apparatus.

14. An apparatus, comprising at least one processor, at least one memory, and computer-readable code stored on the at least one memory, the at least one memory and the computer-readable program code configured to, with the at least one processor, cause the apparatus at least to:

store in memory of the apparatus a location configuration information response that is one of received from or for transmission to another apparatus over a wireless connection, the location configuration response comprising a single frame of data and including:

a measurement type field including data indicating a location of a subject, a latitude field including data indicating a latitude in degrees of the subject, a longitude field including data indicating a longitude in degrees of the subject, an altitude field including data indicating an altitude, a subelement comprising:

a subelement identifier field including data indicating that the subelement is an orientation response subelement, a length field including data indicating a length of a data field, and a data field having a length equal to the length indicated in the length field and including data indicating yaw, pitch and roll orientation parameter values of the subject, wherein the data field includes data indicating a resolution of the yaw orientation parameter values and/or the pitch orientation parameter values and/or the roll orientation parameter values of the subject, and wherein the yaw, pitch and roll orientation parameter values are from yaw, pitch and roll measurements taken by an orientation detector of a mobile wireless device, the at least one memory and the computer-readable program code being further configured to, with the at least one processor, cause the apparatus at least to:

receive the location configuration information response from the other apparatus over a wireless connection prior to storing the location configuration information response, or transmit the location configuration information response to the other apparatus over a wireless connection, wherein the other apparatus from which the location configuration information response is received comprises a mobile wireless device, and wherein the other apparatus to which the location configuration information response is transmitted comprises one of a mobile wireless device or a wireless access point.

15. The apparatus as claimed in claim 14, wherein the frame of data is a radio measurement response action frame.

16. The apparatus as claimed in claim 14, wherein the at least one memory and the computer-readable program code are configured to, with the at least one processor, cause the apparatus at least to measure yaw, pitch and roll of the subject to provide the data indicating yaw, pitch and roll orientation parameter values.

17. The apparatus as claimed in claim 14, wherein the apparatus comprises one of a mobile wireless device or an access point when the at least one memory and the computer-readable program code are configured to, with the at least one processor, cause the apparatus at least to receive the location configuration information response from the other apparatus.

18. The apparatus as claimed in claim 14, wherein the apparatus comprises a mobile wireless device when the at least one memory and the computer-readable program code are configured to, with the at least one processor, cause the apparatus at least to transmit the location configuration information response to the other apparatus.

19. The apparatus as claimed in claim 14, wherein the data field includes at least one of:

data indicating whether at least one of the yaw orientation parameter values, the pitch orientation parameter values or the roll orientation parameter values of the subject are absolute or relative values;

data indicating that the yaw, pitch and roll orientation parameter values of the subject are values relative to reference planes of a body of the subject; or data indicating that at least one of the yaw orientation parameter values, the pitch orientation parameter values or the roll orientation parameter values of the subject are relative to a plane defined as intersecting a location of the subject and a location of another device.

* * * * *